(12) United States Patent
Lu et al.

(10) Patent No.: US 12,511,227 B2
(45) Date of Patent: Dec. 30, 2025

(54) ADAPTIVE SELECTION OF A CONFIGURATION-DEPENDENT OPERAND

(71) Applicant: Micron Technology, Inc., Boise, ID (US)

(72) Inventors: Yang Lu, Boise, ID (US); Hyun Yoo Lee, Boise, ID (US); Kang-Yong Kim, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 207 days.

(21) Appl. No.: 18/440,357

(22) Filed: Feb. 13, 2024

(65) Prior Publication Data

US 2024/0273015 A1    Aug. 15, 2024

Related U.S. Application Data

(60) Provisional application No. 63/485,186, filed on Feb. 15, 2023.

(51) Int. Cl.
*G06F 12/00*      (2006.01)
*G06F 12/02*      (2006.01)

(52) U.S. Cl.
CPC ................ *G06F 12/0223* (2013.01)

(58) Field of Classification Search
None
See application file for complete search history.

(56) References Cited

U.S. PATENT DOCUMENTS

| | | | |
|---|---|---|---|
| 2012/0163098 A1* | 6/2012 | Ku | G11C 7/1063 365/189.05 |
| 2014/0244922 A1* | 8/2014 | Bains | G11C 7/1072 711/105 |
| 2017/0110173 A1* | 4/2017 | Matsuno | G11C 7/1039 |

* cited by examiner

*Primary Examiner* — Daniel D Tsui
(74) *Attorney, Agent, or Firm* — Colby Nipper PLLC

(57) ABSTRACT

Described apparatuses and methods provide adaptive selection of a configuration-dependent operand. Adaptive selection enables a die to automatically detect its configuration and dynamically read from or write to configuration-dependent operands of one or more mode registers based on the configuration. In this manner, a memory device with dies having a first byte width (e.g., 1 byte) can be transparent to a memory channel having a second byte width that is larger than the first byte width (e.g., two bytes). For example, two 8-bit dies enabled with aspects of adaptive selection may be coupled to a 16-bit memory channel and each automatically detect its byte position (e.g., upper byte or lower byte). Based on the detected byte position or byte indicator, the 8-bit dies may be configured for use through respective mode registers that correspond to the byte position or assignment of the die.

20 Claims, 9 Drawing Sheets

800 ─↘

```
┌─────────────────────────────────────────────┐
│  Determine a configuration of a memory die  │
│  that is coupled to a subset of data lines  │
│  of a memory channel                        │
│                   802                       │
└─────────────────────────────────────────────┘
                      │
                      ▼
┌─────────────────────────────────────────────┐
│  Configure the memory die to operate using  │
│  a first set of operands or a second set of │
│  operands based on the determined           │
│  configuration of the memory die, the first │
│  and second set of operands are associated  │
│  with one or more mode registers            │
│                   804                       │
└─────────────────────────────────────────────┘
```

FIG. 8

ADAPTIVE SELECTION OF A CONFIGURATION-DEPENDENT OPERAND

RELATED APPLICATION(S)

This application claims the benefit of U.S. Provisional Application No. 63/485,186, filed Feb. 15, 2023, the contents of which are hereby incorporated by reference in their entirety.

BACKGROUND

Computers, smartphones, and other electronic devices rely on processors and memories. A processor executes code based on data to run applications and provide features to a user. The processor obtains the code and the data from a memory. The memory in an electronic device can include volatile memory (e.g., random-access memory (RAM)) and non-volatile memory (e.g., flash memory). Like the capabilities of a processor, the capabilities of a memory can impact the performance of an electronic device. This performance impact can increase as processors are developed that execute code faster and as applications operate on increasingly larger data sets that require ever-larger memories.

BRIEF DESCRIPTION OF THE DRAWINGS

Apparatuses of and techniques for adaptive selection of a configuration-dependent operand are described with reference to the following drawings. The same numbers are used throughout the drawings to reference like features and components:

FIG. 8 illustrates an example method for performing aspects of adaptive selection of a configuration-dependent operand.

DETAILED DESCRIPTION

Figure 1:
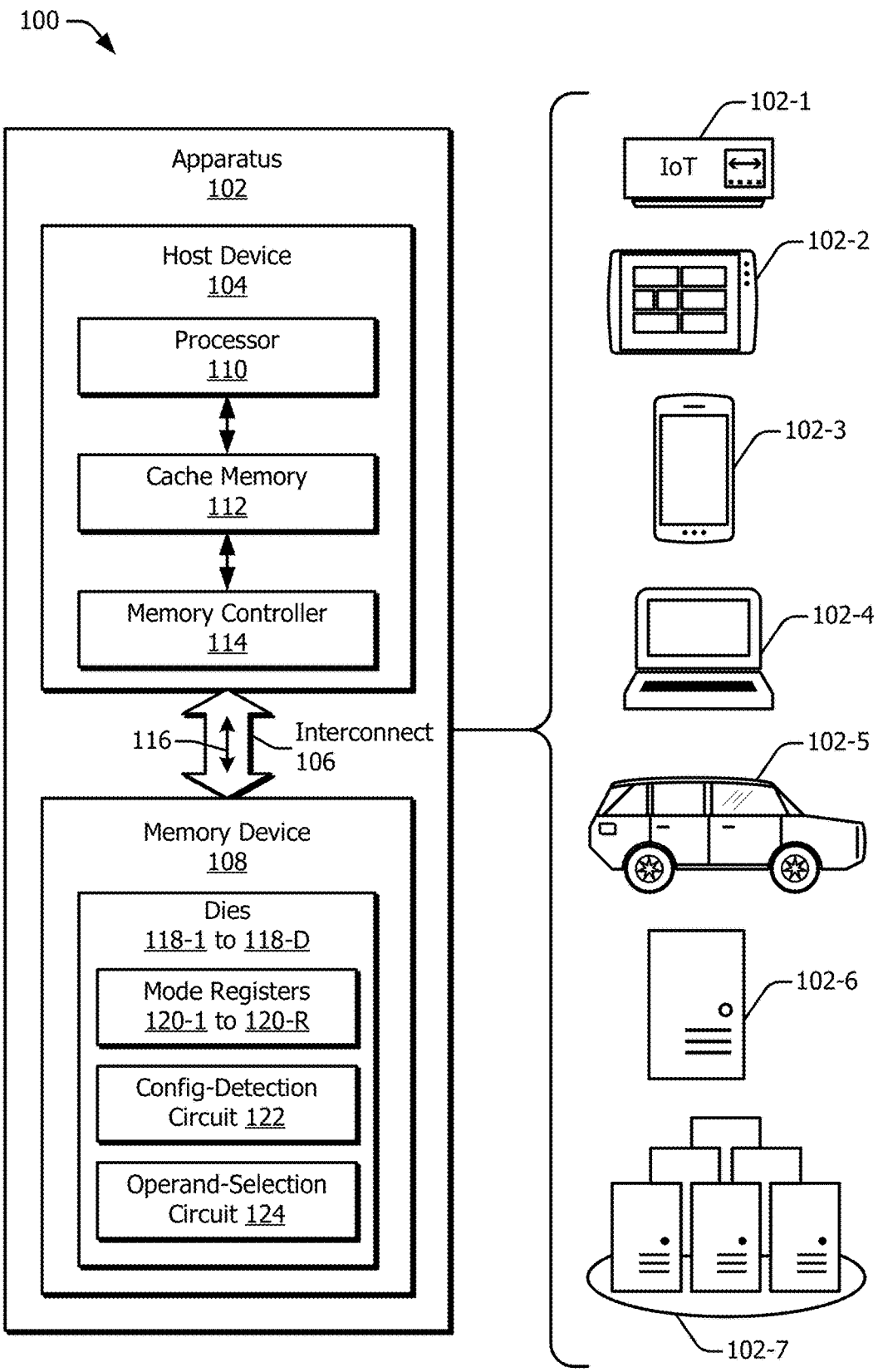
FIG. 1 illustrates example apparatuses that can implement aspects of adaptive selection of a configuration-dependent operand.

Processors and memory work in tandem to provide features to users of computers and other electronic devices. As processors and memory operate more quickly together in a complementary manner, an electronic device can provide enhanced features, such as high-resolution graphics and artificial intelligence (AI) analysis. Some applications, such as those for financial services, medical devices, and advanced driver assistance systems (ADAS), can also demand more-reliable memories. These applications use increasingly reliable memories to limit errors in financial transactions, medical decisions, and object identification. However, in some implementations, more-reliable memories can sacrifice bit densities, power efficiency, and simplicity.

There are many types of DRAM, including synchronous DRAM (SDRAM). Low-power double data rate (DDR) SDRAM, which is sometimes referred to as LPDDR or mobile DRAM, can use less power than other types of DDR SDRAM. Accordingly, device manufacturers often choose LPDDR memory for use in mobile devices such as smartphones, tablets, and laptops. In some applications, LPDDR memory operates at higher data rates than other types of DDR SDRAM. Increasingly, cloud financial service and automotive assistance system companies use LPDDR memory in server applications to reduce electricity usage and, therefore, lower operational costs across large data centers. Designing LPDDR memory for different use cases and applications, however, is challenging.

The current LPDDR5 protocol supports 16 bits per channel for procedures such as signal training, bus characterization, and data transfers. A memory device that supports the LPDDR5 protocol can include a die that has a 16-bit interface. In this manner, the 16-bit interface of the die directly corresponds with a 16-bit memory channel associated with the LPDDR5 protocol. Explained another way, an interface of the die has a same byte width as the memory channel. While this can be straightforward to implement, a cost associated with this die can be higher compared to other types of dies, such as another die that has an 8-bit interface.

To reduce cost, a memory device can be implemented with two dies having 8-bit interfaces. To operate with the 16-bit memory channel associated with the LPDDR5 protocol, this memory device can be configured in accordance with a two-byte mode. In this case, the 8-bit interface of a first die of the memory device is coupled to a first subset of data lines that handles an upper byte of the 16-bit memory channel. Additionally, the 8-bit interface of a second die of the memory device is coupled to a second subset of data lines that handles a lower byte of the 16-bit memory channel.

A problem occurs, however, when reading from or writing to byte-dependent operands of one or more mode registers of the dies. Each die may be unaware of its byte configuration relative to the 16-bit memory channel (e.g., as upper byte die or lower byte die). By default, the dies may consider any data received at the 8-bit interface to be associated with a lower byte. During a training procedure, for instance, one of the dies may unintentionally update the wrong byte-dependent operands of one or more mode registers. Consequently, the mismatch between the byte-width of the channel and the byte-width of the interface of the dies can make the two-byte mode of the memory device incompatible or difficult to use with the LPDDR5 protocol.

To address this problem, techniques for implementing adaptive selection of a configuration-dependent operand are described. Adaptive selection enables a die to automatically detect its configuration and dynamically read from or write to configuration-dependent operands of one or more mode registers based on the configuration. In this manner, a memory device with dies having a first byte width (e.g., 1 byte) can be transparent to a memory channel having a second byte width that is larger than the first byte width (e.g., two bytes). With adaptive selection, configuration-dependent operands of one or more mode registers can be correctly programmed with the training results. For example, two 8-bit dies enabled with aspects of adaptive selection may be coupled to a 16-bit memory channel and each automatically detect its byte position (e.g., upper byte or lower byte). Based on the detected byte position or byte indicator, the 8-bit dies may be configured for use through respective mode registers (an upper mode register or a lower mode register) that correspond to the byte position or assignment of the die.

A memory device such as the one described above can be secured to a printed circuit board (PCB), such as a rigid or flexible motherboard. The printed circuit board can include sockets for receiving at least one processor and one or more memory devices. Wiring infrastructure can be disposed on at least one layer of the printed circuit board, enabling communication between two or more components. Some printed circuit boards include multiple sockets that are each shaped as a linear slot designed to accept a dual in-line memory module (DIMM) (e.g., a memory device). These sockets can be fully occupied by dual in-line memory modules while a processor is still able to utilize additional memory. In such situations, the system is capable of greater performance if additional memory is available to the processor.

Printed circuit boards may also include at least one peripheral component interconnect express (PCIe®) slot. A PCIe slot is designed to provide a common interface for various types of components that may be coupled to a PCB. The PCIe protocol can provide higher rates of data transfer, smaller footprints, or both to the PCB compared to some other standards. Accordingly, certain PCBs enable a processor to access a memory device that is connected to the PCB via a PCIe slot.

In implementations, accessing a memory solely using a PCIe protocol may not offer a desired functionality or reliability. In such implementations, another protocol may be layered on top of the PCIe protocol. As an example, one higher-level protocol is the Compute Express Link™ (CXL) protocol. The CXL protocol can be implemented over a physical layer that is governed by, for example, the PCIe protocol. The CXL protocol can provide a memory-coherent interface capable of high-bandwidth or low-latency data transfers or data transfers with both conditions.

The CXL protocol addresses some of the limitations of PCIe links by providing an interface that leverages, for example, the PCIe 5.0 physical layer while providing lower-latency paths for memory access and coherent caching between processors and memory devices. The CXL protocol can offer high-bandwidth, low-latency connectivity between a host device (e.g., a processor, central processing units (CPUs), a system-on-a-chip (SoC)) and memory devices (e.g., dual in-line memory modules, accelerators, memory expanders). The CXL protocol also addresses growing high-performance computational workloads by supporting diverse processing and memory systems with potential applications in AI, machine learning (ML), advanced driver assistance systems, and other high-performance computing environments. With the potential to increase memory density by utilizing improved communications protocols such as CXL, memory devices may be specified with additional design constraints that create new challenges for designers of memory devices. Although some implementations are described herein in terms of a CXL memory module, the memory module can be any memory module, such as a single in-line memory module (SIMM), a dual in-line memory module, or another memory device.

Example Operating Environments

FIG. 1 illustrates, at 100 generally, an example operating environment including an apparatus 102 that can implement adaptive selection of a configuration-dependent operand. The apparatus 102 can include various types of electronic devices, including an internet-of-things (IoT) device 102-1, tablet device 102-2, smartphone 102-3, notebook computer 102-4, passenger vehicle 102-5, server computer 102-6, and server cluster 102-7 that may be part of cloud computing infrastructure, a data center, or a portion thereof (e.g., a printed circuit board (PCB)). Other examples of the apparatus 102 include a wearable device (e.g., a smartwatch or intelligent glasses), entertainment device (e.g., a set-top box, video dongle, smart television, a gaming device), desktop computer, motherboard, server blade, consumer appliance, vehicle, drone, industrial equipment, security device, sensor, or the electronic components thereof. Each type of apparatus 102 can include one or more components to provide computing functionalities or features.

In example implementations, the apparatus 102 can include at least one host device 104, at least one interconnect 106, and at least one memory device 108. The host device 104 can include at least one processor 110, at least one cache memory 112, and at least one memory controller 114. The memory device 108, which can also be realized with a memory module, can include, for example, a dynamic random-access memory (DRAM) die or module (e.g., Low-Power Double Data Rate synchronous DRAM (LPDDR SDRAM)). The DRAM die or module can include a three-dimensional (3D) stacked DRAM device, which may be a high-bandwidth memory (HBM) device or a hybrid memory cube (HMC) device. The memory device 108 can operate as a main memory for the apparatus 102. Although not illustrated, the apparatus 102 can also include storage memory. The storage memory can include, for example, a storage-class memory device (e.g., a flash memory, hard disk drive, solid-state drive, phase-change memory (PCM), or memory employing 3D XPoint™).

The processor 110 is operatively coupled to the cache memory 112, which is operatively coupled to the memory controller 114. The processor 110 is also coupled, directly or indirectly, to the memory controller 114. The host device 104 may include other components to form, for instance, a system-on-a-chip (SoC). The processor 110 may include a general-purpose processor, central processing unit, graphics processing unit (GPU), neural network engine or accelerator, application-specific integrated circuit (ASIC), field-programmable gate array (FPGA) integrated circuit (IC), or communications processor (e.g., a modem or baseband processor).

In operation, the memory controller 114 can provide a high-level or logical interface between the processor 110 and at least one memory (e.g., an external memory). The memory controller 114 may be realized with any of a variety of suitable memory controllers (e.g., a double-data-rate (DDR) memory controller that can process requests for data stored on the memory device 108). Although not shown, the host device 104 may include a physical interface (PHY) that transfers data between the memory controller 114 and the memory device 108 through the interconnect 106. For example, the physical interface may be an interface that is compatible with a DDR PHY Interface (DFI) Group interface protocol. An example physical interface is further described with respect to FIG. 4. The memory controller 114 can, for example, receive memory requests from the processor 110 and provide the memory requests to external memory with appropriate formatting, timing, and reordering. The memory controller 114 can also forward to the processor 110 responses to the memory requests received from external memory.

The host device 104 is operatively coupled, via the interconnect 106, to the memory device 108. In some examples, the memory device 108 is connected to the host device 104 via the interconnect 106 with an intervening buffer or cache. The memory device 108 may operatively couple to storage memory (not shown). The host device 104 can also be coupled, directly or indirectly via the interconnect 106, to the memory device 108 and the storage memory. The interconnect 106 and other interconnects (not illustrated in FIG. 1) can transfer data between two or more components of the apparatus 102. Examples of the interconnect 106 include a bus (e.g., a unidirectional or bidirectional bus), switching fabric, or one or more wires that carry voltage or current signals. The interconnect 106 can propagate one or more communications 116 between the host device 104 and the memory device 108. For example, the host device 104 may transmit a memory request to the memory device 108 over the interconnect 106. Also, the memory device 108 may transmit a corresponding memory response to the host device 104 over the interconnect 106.

In other implementations, the interconnect 106 can be realized as a CXL link. In other words, the interconnect 106 can comport with at least one CXL standard or protocol. The CXL link can provide an interface on top of the physical layer and electricals of a PCIe 5.0 physical layer. The CXL link can cause requests to and responses from the memory device 108 to be packaged as flits. In still other implementations, the interconnect 106 can be another type of link, including a PCIe 5.0 link. In this document, some terminology may draw from one or more of these standards or versions thereof, like the CXL standard, for clarity. The described principles, however, are also applicable to memories and systems that comport with other standards and types of interconnects.

The illustrated components of the apparatus 102 represent an example architecture with a hierarchical memory system. A hierarchical memory system may include memories at different levels, with each level having memory with a different speed or capacity. As illustrated, the cache memory 112 logically couples the processor 110 to the memory device 108. In the illustrated implementation, the cache memory 112 is at a higher level than the memory device 108. A storage memory, in turn, can be at a lower level than the main memory (e.g., the memory device 108). Memory at lower hierarchical levels may have a decreased speed but increased capacity relative to memory at higher hierarchical levels.

The apparatus 102 can be implemented in various manners with more, fewer, or different components. For example, the host device 104 may include multiple cache memories (e.g., including multiple levels of cache memory) or no cache memory. In other implementations, the host device 104 may omit the processor 110 or the memory controller 114. A memory (e.g., the memory device 108) may have an "internal" or "local" cache memory. As another example, the apparatus 102 may include cache memory between the interconnect 106 and the memory device 108. Computer engineers can also include any of the illustrated components in distributed or shared memory systems.

Computer engineers may implement the host device 104 and the various memories in multiple manners. In some cases, the host device 104 and the memory device 108 can be disposed on, or physically supported by, a printed circuit board (e.g., a rigid or flexible motherboard). The host device 104 and the memory device 108 may additionally be integrated together on an integrated circuit or fabricated on separate integrated circuits and packaged together. The memory device 108 may also be coupled to multiple host devices 104 via one or more interconnects 106 and may respond to memory requests from two or more host devices 104. Each host device 104 may include a respective memory controller 114, or the multiple host devices 104 may share a memory controller 114. This document describes with reference to FIG. 1 an example computing system architecture having at least one host device 104 coupled to a memory device 108.

Two or more memory components (e.g., modules, dies, banks, or bank groups) can share the electrical paths or couplings of the interconnect 106. The interconnect 106 can include at least one command-and-address bus (CA bus) and at least one data bus (DQ bus). The command-and-address bus can transmit addresses and commands from the memory controller 114 of the host device 104 to the memory device 108, which may exclude propagation of data. The data bus can propagate data between the memory controller 114 and the memory device 108. The memory device 108 may also be implemented as any suitable memory including, but not limited to, DRAM, SDRAM, three-dimensional (3D) stacked DRAM, DDR memory, or LPDDR memory (e.g., LPDDR DRAM or LPDDR SDRAM).

The memory device 108 can form at least part of the main memory of the apparatus 102. The memory device 108 may, however, form at least part of a cache memory, a storage memory, or a system-on-chip of the apparatus 102. The memory device 108 includes at least two dies 118-1 to 118-D, where D represents a positive integer that is greater than or equal to two. The dies 118 can be realized as DDR dies, including generational iterations (e.g., DDR2, DDR3, DDR4, DDR5); GDDR dies; HBM dies; LPDDR dies; DRAM dies; SDRAM dies; and so forth. Each die 118 includes multiple mode registers 120-1 to 120-R, at least one configuration-detection circuit 122 (config-detection circuit 122), and at least one operand-selection circuit 124 (oper-and-selection circuit 124). The variable R represents a positive integer.

Figure 5:
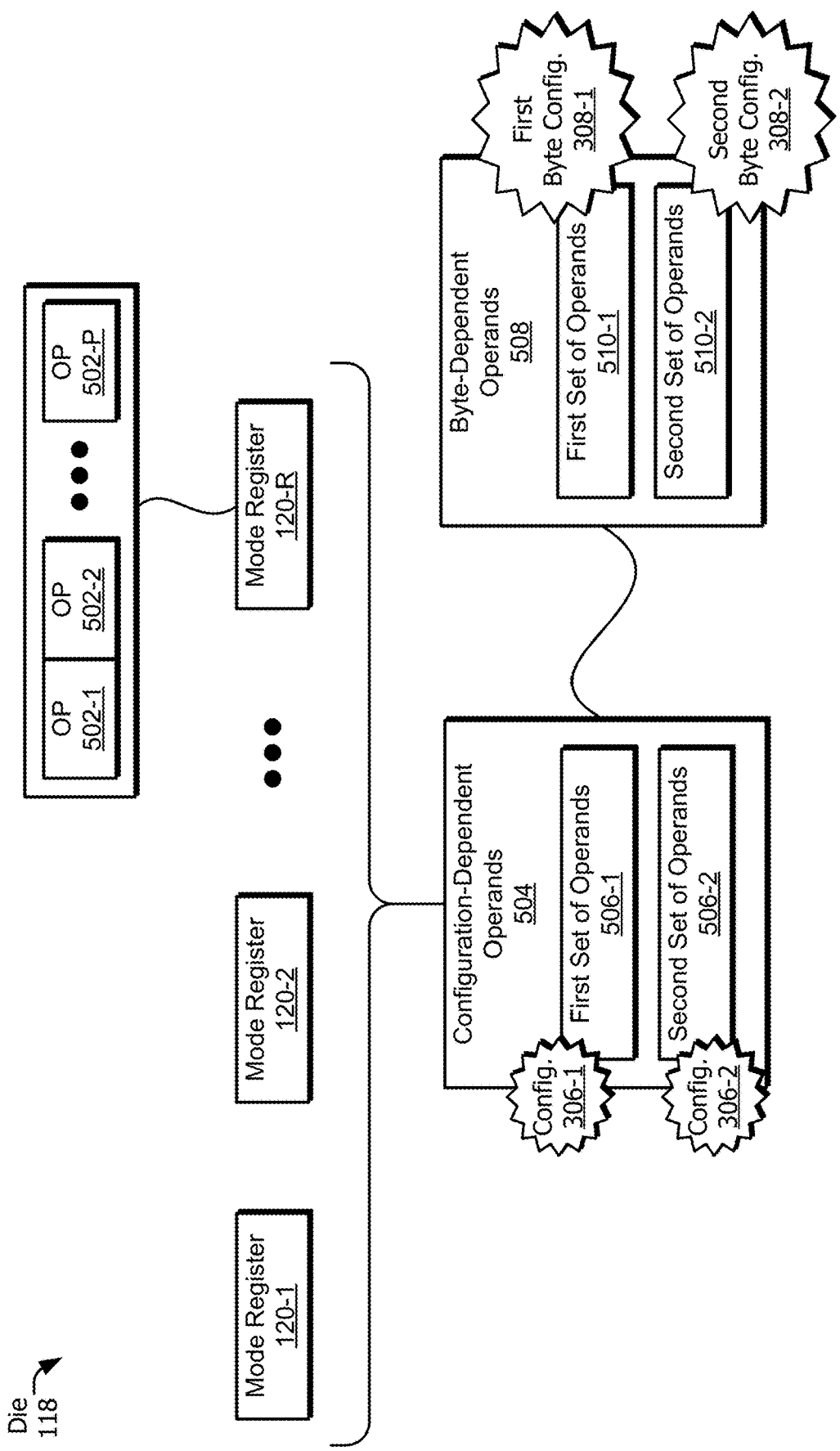
FIG. 5 illustrates example mode registers.

The mode registers 120-1 to 120-R store configuration information associated with the die 118 and are further described with respect to FIG. 5. The configuration-detection circuit 122 can automatically detect (or determine) a configuration of the die 118. An operation of the configuration-detection circuit 122 is further described with respect to FIG. 6. The operand-selection circuit 124 provides read and/or write access to appropriate configuration-dependent operands associated with one or more of the mode registers 120-1 to 120-R based on the configuration of the die 118. An example operand-selection circuit 124 is further described with respect to FIG. 6. The memory device 108 is further described with respect to FIG. 2.

Figure 2:
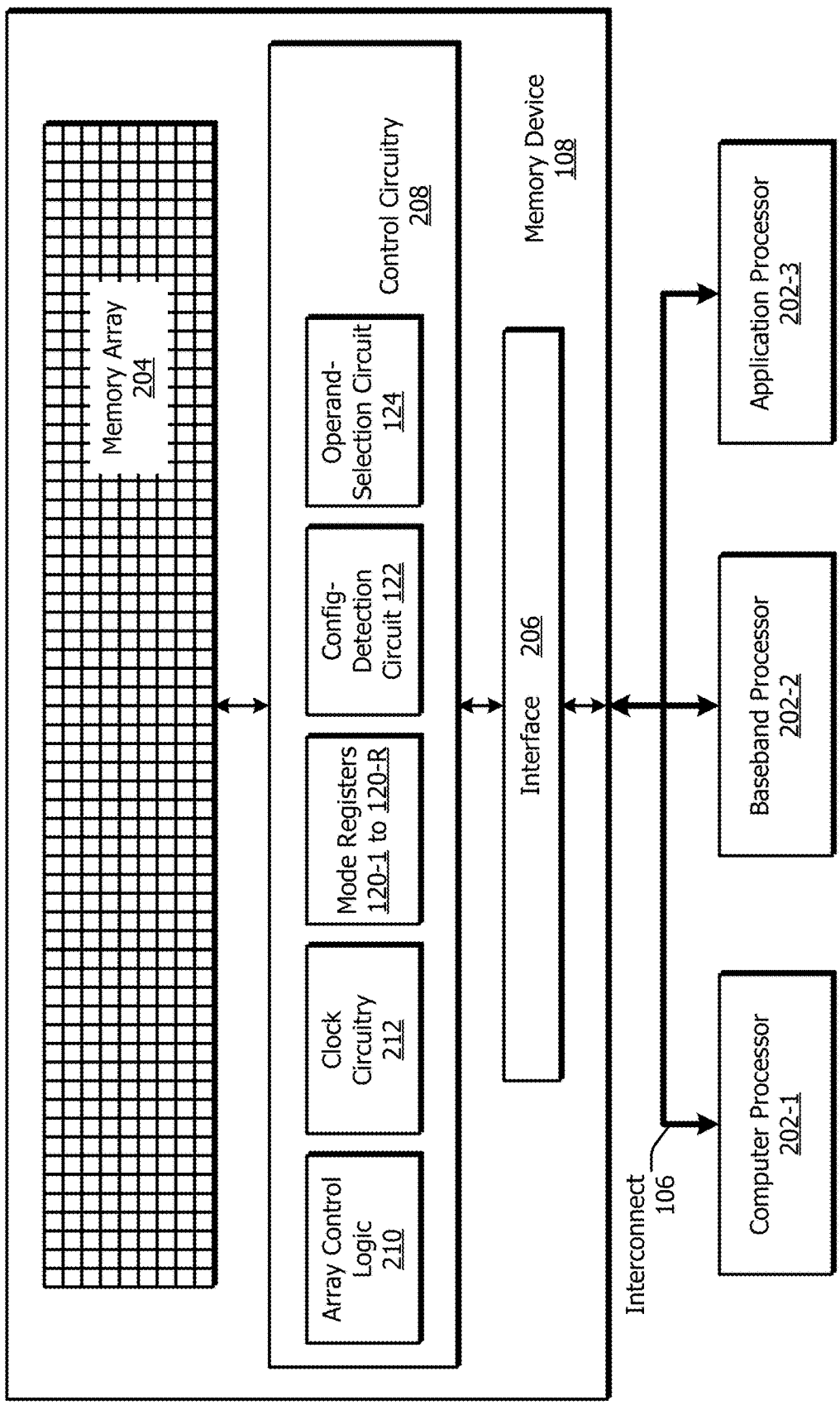
FIG. 2 illustrates an example computing system that includes a memory device in which aspects of adaptive selection of a configuration-dependent operand can be implemented.

FIG. 2 illustrates an example computing system 200 that can implement aspects of adaptive selection of a configuration-dependent operand. In some implementations, the computing system 200 includes at least one memory device 108, at least one interconnect 106, and at least one processor 202. The memory device 108 can include, or be associated with, at least one memory array 204, at least one interface 206, and control circuitry 208 (or periphery circuitry) operatively coupled to the memory array 204. The memory array 204 can include an array of memory cells, including but not limited to memory cells of DRAM, SDRAM, three-dimensional (3D) stacked DRAM, DDR memory, LPDDR SDRAM, and so forth. The memory array 204 and the control circuitry 208 may be components on a single semiconductor die or on separate semiconductor dies. The memory array 204 or the control circuitry 208 may also be distributed across multiple dies. This control circuitry 208 may manage traffic on a bus that is separate from the interconnect 106.

The control circuitry 208 can include various components that the memory device 108 can use to perform various operations. These operations can include communicating with other devices, managing memory performance, performing refresh operations (e.g., self-refresh operations or auto-refresh operations), and performing memory read or write operations. For example, the control circuitry 208 can include array control logic 210, clock circuitry 212, the mode registers 120-1 to 120-R, the configuration-detection circuit 122, and the operand-selection circuit 124. The array control logic 210 can include circuitry that provides command decoding, address decoding, input/output functions, amplification circuitry, power supply management, power control modes, and other functions. The clock circuitry 212 can synchronize various memory components with one or more external clock signals provided over the interconnect 106, including a command-and-address clock or a data clock. The clock circuitry 212 can also use an internal clock signal to synchronize memory components and may provide timer functionality.

The interface 206 can couple the control circuitry 208 or the memory array 204 directly or indirectly to the interconnect 106. In some implementations, the array control logic 210, the clock circuitry 212, the mode registers 120-1 to 120-R, the configuration-detection circuit 122, and the operand-selection circuit 124 can be part of a single component (e.g., the control circuitry 208). In other implementations, one or more of the array control logic 210, the clock circuitry 212, the mode registers 120-1 to 120-R, the configuration-detection circuit 122, or the operand-selection circuit 124 may be implemented as separate components, which can be provided on a single semiconductor die or disposed across multiple semiconductor dies. These components may individually or jointly couple to the interconnect 106 via the interface 206.

The interconnect 106 may use one or more of a variety of interconnects that communicatively couple together various components and enable commands, addresses, or other information and data to be transferred between two or more components (e.g., between the memory device 108 and the processor 202). Although the interconnect 106 is illustrated with a single line in FIG. 2, the interconnect 106 may include at least one bus, at least one switching fabric, one or more wires or traces that carry voltage or current signals, at least one switch, one or more buffers, and so forth. Further, the interconnect 106 may be separated into at least a command-and-address bus and a data bus. As discussed above with respect to FIG. 1, the interconnect 106 can include a CXL link or comport with at least one CXL standard. The CXL link can provide an interface or overlay on top of the physical layer and electricals of the PCIe 5.0 physical layer.

In some aspects, the memory device 108 may be a "separate" component relative to the host device 104 (of FIG. 1) or any of the processors 202. The separate components can include a printed circuit board, memory card, memory stick, and memory module (e.g., a single in-line memory module (SIMM) or dual in-line memory module (DIMM)). Thus, separate physical components may be located together within the same housing of an electronic device or may be distributed over a server rack, a data center, and so forth. Alternatively, the memory device 108 may be integrated with other physical components, including the host device 104 or the processor 202, by being combined on a printed circuit board or in a single package or a system-on-chip.

As shown in FIG. 2, the processors 202 may include a computer processor 202-1, a baseband processor 202-2, and an application processor 202-3, coupled to the memory device 108 through the interconnect 106. The processors 202 may include or form a part of a central processing unit, graphics processing unit, system-on-chip, application-specific integrated circuit, or field-programmable gate array. In some cases, a single processor can comprise multiple processing resources, each dedicated to different functions (e.g., modem management, applications, graphics, central processing). In some implementations, the baseband processor 202-2 may include or be coupled to a modem (not illustrated in FIG. 2) and referred to as a modem processor. The modem or the baseband processor 202-2 may be coupled wirelessly to a network via, for example, cellular, Wi-Fi®, Bluetooth®, near field, or another technology or protocol for wireless communication.

In some implementations, the processors 202 may be connected directly to the memory device 108 (e.g., via the interconnect 106). In other implementations, one or more of the processors 202 may be indirectly connected to the memory device 108 (e.g., over a network connection or through one or more other devices). Further, the processor 202 may be realized as one that can communicate over a CXL-compatible interconnect. Alternatively, two or more processors 202 may access the memory device 108 using a shared link controller. In some of such cases, the memory device 108 may be implemented as a CXL-compatible memory device (e.g., as a CXL Type 3 memory expander) or another memory device that is compatible with a CXL protocol may also or instead be coupled to the interconnect 106.

Example Techniques and Hardware

Figure 3:
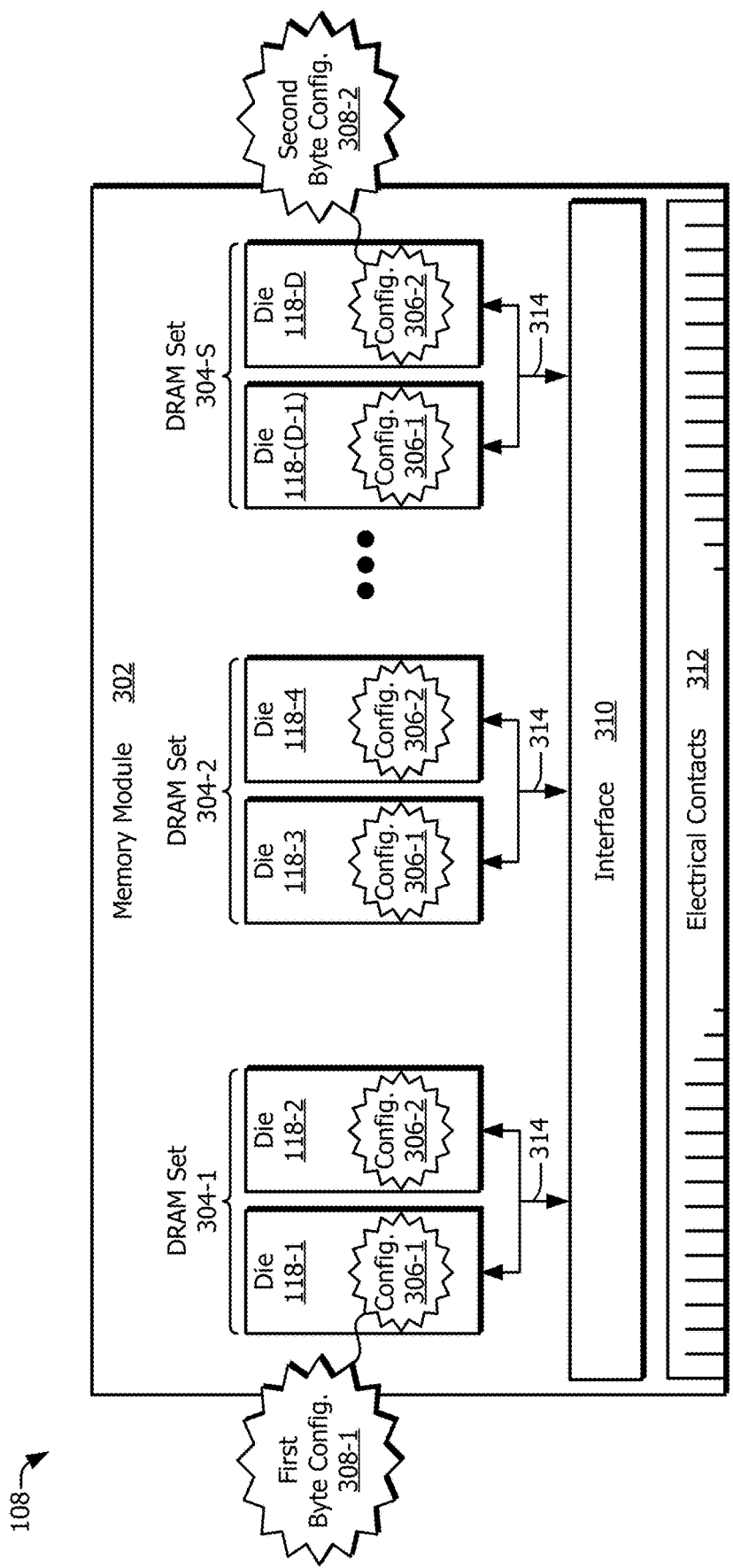
FIG. 3 illustrates an example memory device that can implement aspects of adaptive selection of a configuration-dependent operand.

FIG. 3 illustrates an example memory device 108 that can perform certain aspects of adaptive selection of a configuration-dependent operand. The memory device 108 includes a memory module 302, which can include multiple dies 118 (or dice), such as dies 118-1, 118-2, 118-3, 118-4 . . . 118-(D−1), and 118-D. The memory module 302 can be a SIMM or a DIMM. As another example, the memory module 302 can interface with other components via a bus interconnect (e.g., a Peripheral Component Interconnect Express (PCIe®) bus). The memory device 108 illustrated in FIGS. 1 and 2 can correspond, for example, to multiple dies 118-1 to 118-D, or a memory module 302 with two or more dies 118.

The memory module 302 can be implemented in various manners. For example, the memory module 302 may include a printed circuit board, and the multiple dies 118-1 to 118-D may be mounted or otherwise attached to the printed circuit board. The dies 118 (e.g., memory dies) may be arranged in a line or along two or more dimensions (e.g., forming a grid or array). The dies 118 may have a similar size or may have different sizes. Each die 118 may be similar to another die 118 or different in size, shape, data capacity, or control circuitries. The dies 118 may also be positioned on a single side or on multiple sides of the memory module 302. In some cases, the memory module 302 may be part of a CXL memory system or module.

Two or more of the dies 118-1 to 118-D can be implemented as a DRAM set 304. In some cases, the memory module 302 includes multiple DRAM sets 304-1, 304-2 . . . 304-S, where S represents a positive integer. Each DRAM set 304 can include a pair of dies 118 or a set of dies 118 with more than two dies 118. For example, when configured as 8-bit dies (or x8 dies), two of the dies 118 may be paired to form a 16-bit die set (e.g., x16 die pair for two-byte mode). In the depicted configuration, the memory module 302 includes a first DRAM set 304-1 with dies 118-1 and 118-2, a second DRAM set 304-2 with dies 118-3 and 118-4, and a DRAM set 304-S with dies 118-(D−1) and 118-D.

The dies 118 within each DRAM set 304 can be configured differently. For example, the dies 118-1, 118-3, and 118-(D−1) can have a first configuration 306-1. Likewise, the dies 118-2, 118-4, and 118-D can have a second configuration 306-2. The configurations 306-1 and 306-2 can be based on a subset of data lines (e.g., data I/O lines) coupled to the die 118. In general, the configuration 306 indicates a byte position or an assignment of the die 118 within the memory module 302. For example, the first configuration 306-1 can represent a first byte configuration 308-1 (e.g., a lower byte configuration), and the second configuration 306-2 can represent a second byte configuration 308-2 (e.g., an upper byte configuration). Generally speaking, the techniques for adaptive selection of a configuration-dependent operand can be extended to any quantity of dies 118 within a DRAM set 304 and any quantity of configurations 306 (e.g., can be extended for any multi-byte mode of the memory device 108).

As shown, the memory module 302 can include an interface 310 and one or more electrical contacts 312 (e.g., pins) to interface the memory module 302 to other components. In aspects, data (DQ) lines 314 operably couple the DRAM sets 304-1 to 304-S to the interface 310 via a local interconnect. The local interconnect can be a unidirectional or bidirectional bus. The dies 118 within each DRAM set 304 can be coupled to different sets of data lines 314, as further described with respect to FIG. 4.

Figure 4:
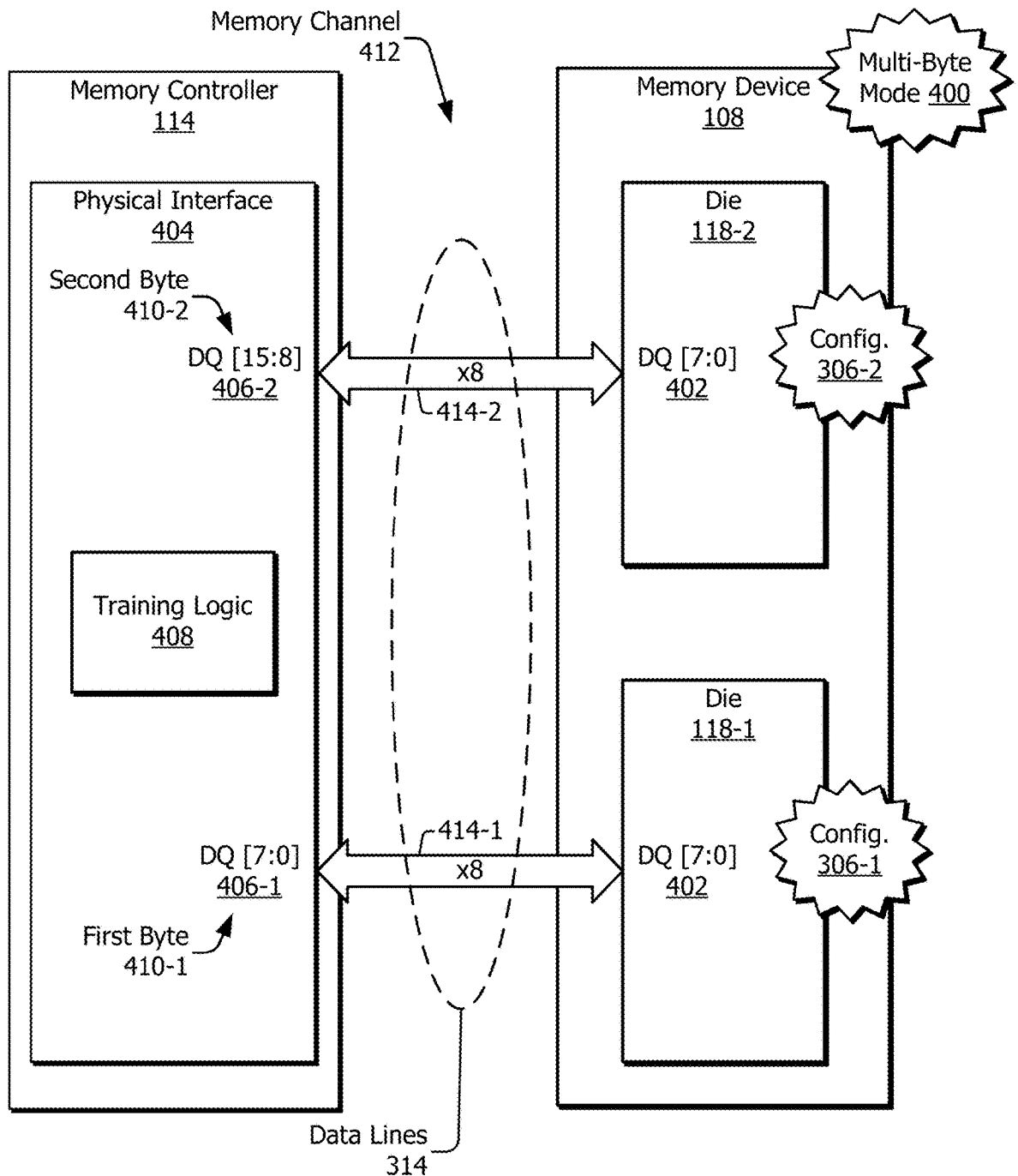
FIG. 4 illustrates example coupling of a memory device to a memory controller.

FIG. 4 illustrates example coupling of the memory device 108 to the memory controller 114. The memory device 108 is configured according to a multi-byte mode 400. In the depicted configuration, the memory device 108 includes two dies 118-1 and 118-2. Each die 118-1 and 118-2 has a set of data pins 402 represented by DQ. Within the memory device 108, the dies 118-1 and 118-2 are paired to form a multi-bit die set in accordance with the multi-byte mode 400. In this example, the data pins 402 are associated with bits [7:0]. Accordingly, the dies 118-1 and 118-2 represent 8-bit dies (or x8 dies), and the multi-byte mode 400 represents a two-byte mode. The techniques for adaptive selection can be generally applied to any multi-byte mode 400 (e.g., modes associated with more than two bytes).

The memory controller 114 implements a physical interface 404. The physical interface 404 includes data pins 406 and training logic 408. More specifically, the physical interface 404 includes a first set of data pins 406-1 associated with bits [7:0] and a second set of data pins 406-2 associated with bits [15:8]. Data associated with a first byte 410-1 (e.g., a lower byte) can pass through the first set of data pins 406-1 while data associated with a second byte 410-2 (e.g., an upper byte) can pass through the second set of data pins 406-2.

The training logic 408 can assist in training various aspects of one or more memory dies 118 that are operably coupled to the physical interface 404. For example, the training logic 408 can assist with determining a reference voltage for a bus of the dies 118-1 and 118-2. Additionally, or alternatively, the training logic 408 can determine timing margins or skew of a clock signal.

The physical interface 404 supports a memory channel 412 associated with multiple bytes (e.g., a multi-byte memory channel). In this example, the memory channel is shown as a two-byte (or 16-bit) channel. The data lines 314 are coupled between the physical interface 404 and the memory device 108. In particular, a first subset of data lines 414-1 couple the data pins 402 of the die 118-1 to the first set of data pins 406-1 of the physical interface 404. Also, a second subset of data lines 414-2 couple the data pins 402 of the die 118-2 to the second set of data pins 406-2 of the physical interface 404. The first and second subsets of data lines 414-1 and 414-2 represent proper subsets of the data lines 314.

In this example, the data pins 402 of the die 118-1 are matched to the data pins 406-1 of the physical interface 404 because both represent bits [7:0]. However, the data pins 402 of the die 118-2 are mismatched with respect to the data pins 406-2 of the physical interface 404 because the data pins 402 of the die 118-2 are associated with bits [7:0] (e.g., a lower byte) while the data pins 406-2 of the physical interface 404 are associated with bits [15:8] (e.g., an upper byte).

To address this mismatch, the dies 118-1 and 118-2 can automatically determine their configurations 306-1 and 306-2 using the configuration-detection circuit 122. Additionally, with the operand-selection circuit 124, the dies 118-1 and 118-2 can each read from or write to appropriate configuration-dependent operands based on its configuration 306. The configuration-dependent operands are further described with respect to FIG. 5.

FIG. 5 illustrates example mode registers 120-1, 120-2 . . . 120-R of the die 118. The die 118 can represent either of the dies 118-1 and 118-2 of FIG. 4. Each mode register 120 includes one or more operands 502, such as operands 502-1, 502-2 . . . 502-P, where P represents a positive integer. In general, an operand 502 defines one or more bits that store information associated with an operation of the die 118. One or more of the operands 502 store information that is associated with the configuration 306 of the die 118. These operands 502 are referred to as configuration-dependent operands 504. In this example, the configuration-dependent operands 504 include a first set of operands 506-1 associated with the first configuration 306-1 and a second set of operands 506-2 associated with the configuration 306-2.

Consider a case in which the multi-byte mode 400 of the memory device 108 represents a two-byte mode. In this case, the first configuration 306-1 represents the first byte configuration 308-1 (e.g., a lower byte configuration), and the second configuration 306-2 represents the second byte configuration 308-2 (e.g., an upper byte configuration). As such, the configuration-dependent operands 504 can be referred to as byte-dependent operands 508, which include a first set of operands 510-1 associated with the first byte configuration 308-1 and a second set of operands 510-2 associated with the second byte configuration 308-2.

The current LPDDR5 specification describes several byte-dependent operands 508, including operands associated with a data reference voltage (VrefDQ), on-die termination (ODT), decision feedback equalization (DFE) quality, a duty cycle monitor (DCM), a duty cycle adjustor (DCA), and data calibration. In some cases, corresponding operands 502 within the first and second set of operands 510-1 and 510-2 are associated with different registers 120. For example, the data reference voltage operand associated with the first byte configuration 308-1 can be in a first register 120 (e.g., mode register 14 in the LPDDR5 specification) while the corresponding data reference voltage operand associated with the second byte configuration 308-2 is in a second register (e.g., mode register 15 in the LPDDR5 specification). In other cases, corresponding operands 502 within the first and second set of operands 510-1 and 510-2 are associated with a same register 120. For example, the on-die termination operands associated with the first and second byte configurations 308-1 and 308-2 can be in a third register 120 (e.g., mode register 17 in the LPDDR5 specification).

The training logic 408 of the physical interface 404 can write data to the configuration-dependent operands 504 of the dies 118-1 and 118-2 to store results of a training procedure. To ensure the appropriate configuration-dependent operands 504 are accessed, the dies 118-1 and 118-2 perform aspects of adaptive selection, as further described with respect to FIG. 6.

Figure 6:
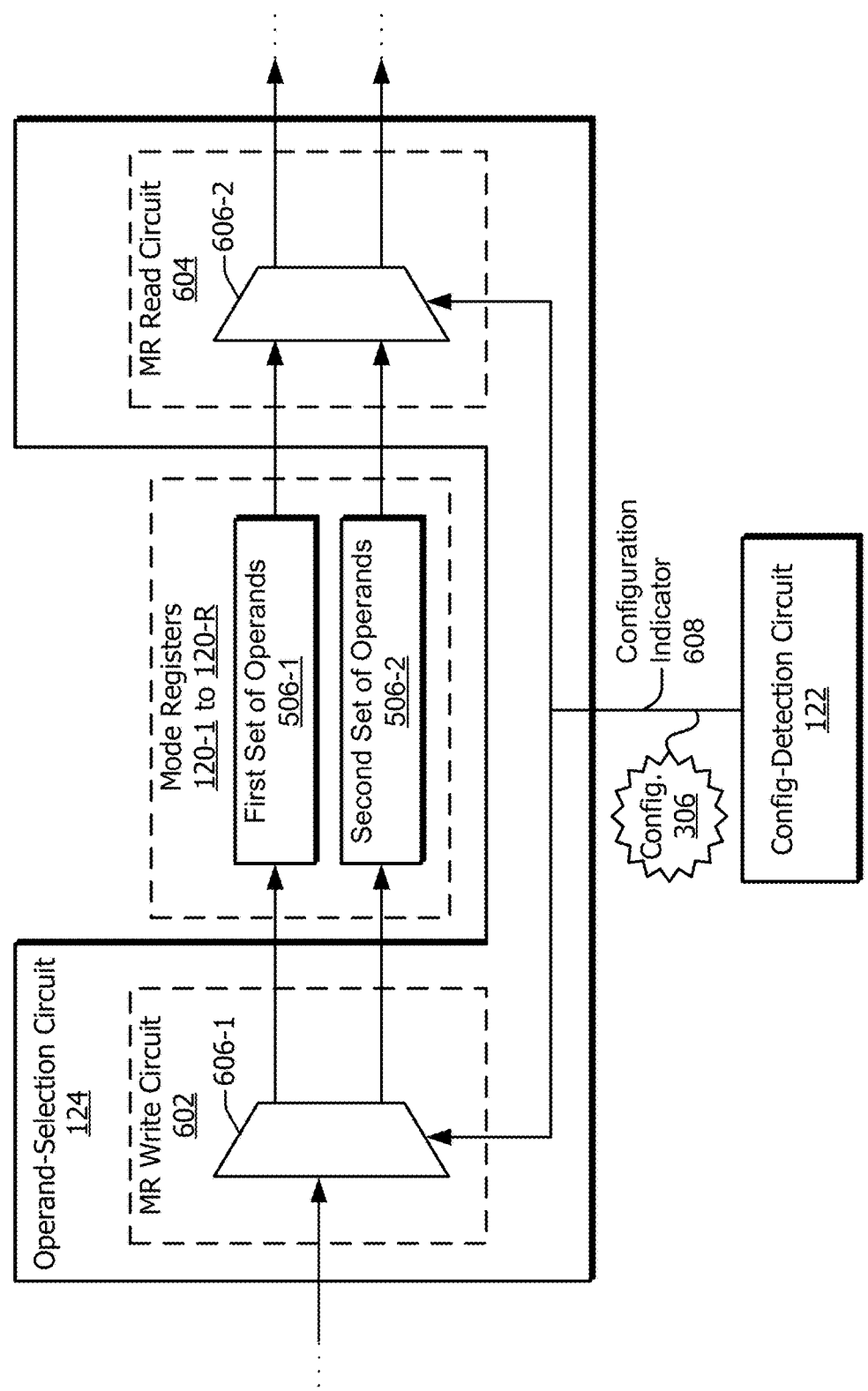
FIG. 6 illustrates examples of a configuration-detection circuit and a operand-selection circuit for performing aspects of adaptive selection of a configuration-dependent operand.

FIG. 6 illustrates examples of the configuration-detection circuit 122 and the operand-selection circuit 124 of the die 118. In the depicted configuration, the configuration-detection circuit 122 is coupled to the operand-selection circuit 124. The operand-selection circuit 124 is coupled to the mode registers 120-1 to 120-R.

The operand-selection circuit 124 includes at least one mode-register write circuit 602 and at least one mode-register read circuit 604. The mode-register write circuit 602 can be coupled between the mode registers 120-1 to 120-R and the data pins 402. The mode-register read circuit 604 can be coupled between the mode registers 120-1 to 120-R and other components of the die 118, such as a voltage generator shown in FIG. 7. The mode-register write circuit 602 and the mode-register read circuit 604 include selection circuits 606-1 and 606-2, respectively. The selection circuits 606-1 and 606-2 can be implemented using multiplexers (as shown in FIG. 6) or using switches.

During operation, the configuration-detection circuit 122 determines the configuration 306 of the die 118. In some example implementations, the configuration-detection circuit 122 automatically detects the configuration 306 of the die 118 based on a bonding of the die 118. The bonding can be determined based on a pull-up or pull-down signal or based on an indicator provided by the memory controller 114 after negotiation with the physical interface 404. In another example implementation, the configuration-detection circuit 122 can detect the configuration 306 by other means besides bonding. The configuration-detection circuit 122 generates a configuration indicator 608, which indicates the configuration 306 (e.g., the byte position or assignment) of the die 118.

The operand-selection circuit 124 accepts the configuration indicator 608 from the configuration-detection circuit 122 and automatically enables access to the first set of operands 506-1 or the second set of operands 506-2 based on the determined configuration 306. For example, the mode-register write circuit 602 enables data to be written to the first set of operands 506-1 if the configuration indicator 608 represents the first configuration 306-1. Also, the mode-register write circuit 602 enables data to be written to the second set of operands 506-2 if the configuration indicator 608 represents the second configuration 306-2.

The mode-register read circuit 604 enables data to be read from the first set of operands 506-1 if the configuration indicator 608 represents the first configuration 306-1. Also, the mode-register read circuit 604 enables data to be read from the second set of operands 506-2 if the configuration indicator 608 represents the second configuration 306-2. In this manner, the operand-selection circuit 124 automatically handles any mismatch between the data pins 402 associated with the die 118 and the data pins 406 associated with the physical interface 404. With this adaptive selection, configuration-dependent operands 504 of one or more mode registers 120 can be correctly accessed for various operations, including training and data transfer.

Figure 7:
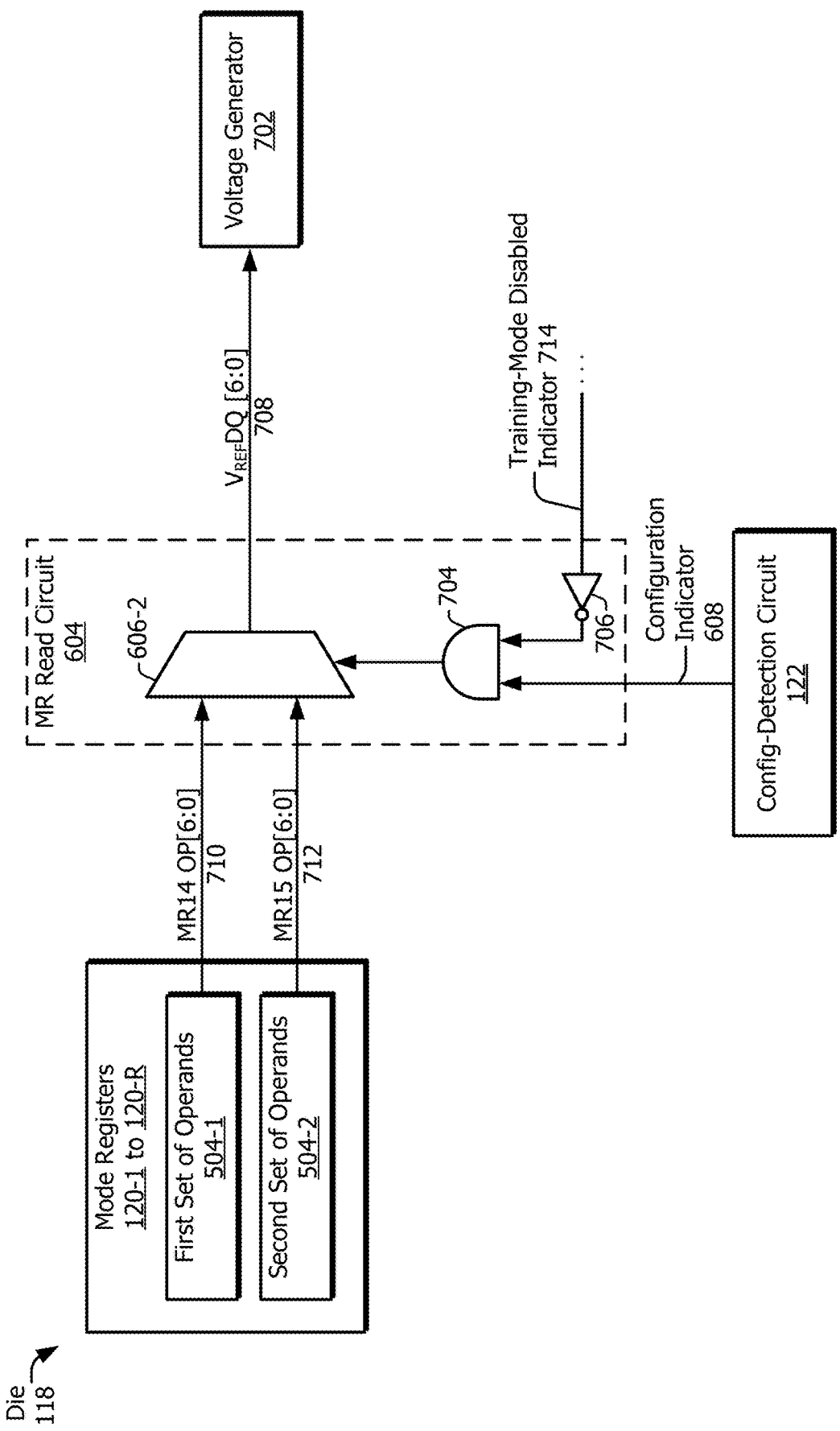
FIG. 7 illustrates an example mode-register read circuit for performing aspects of adaptive selection of a configuration-dependent operand.

FIG. 7 illustrates an example mode-register read circuit 604 for performing aspects of adaptive selection of a configuration-dependent operand. In the depicted configuration, the mode-register read circuit 604 is coupled between the mode registers 120-1 and 120-R and a voltage generator 702 of the die 118. The voltage generator 702 can generate a voltage based on a configuration-dependent operand 504 stored within the one of the mode registers 120-1 to 120-R. The die 118 shown in FIG. 7 can represent the die 118-1 having the configuration 306-1 or the die 118-2 having the configuration 308-2.

The mode-register read circuit 604 includes the selection circuit 606-2 and a logic gate 704, which is implemented as an AND gate. The logic gate 704 is coupled to the selection circuit 606-2 and the configuration-detection circuit 122. The mode-register read circuit 604 also includes an inverter 706.

Consider a situation in which the die 118 reads a data reference voltage 708 and passes the data reference voltage 708 to the voltage generator 702. The data reference voltage 708 can be stored by different configuration-dependent operands 504 depending on the configuration 306 of the die 118. For example, the data reference voltage 708 can be stored as part of the first set of operands 504-1 if the die 118 is in the first configuration 306-1. As another example, the data reference voltage 708 can be stored as part of the second set of operands 504-2 if the die 118 is in the second configuration 306-2. According to the LPDDR5 specification, the first set of operands 504-1 can include operands [6:0] of mode register (MR) 14 (MR14), as represented at 710, and the second set of operands 504-2 can include operands [6:0] of mode register 15 (MR15), as represented at 712.

In this example, the mode-register read circuit 604 determines whether to read the information from 710 or 712 based on the configuration indicator 608 and a training-mode disabled indicator 714, which can be provided by the control circuitry 208. The training-mode disabled indicator 714 indicates whether or not the die 118 is participating in a training procedure. The training-mode disabled indicator 714 can be set to "true" if the die 118 is not participating in a training procedure. Alternatively, if die 118 is participating in a training procedure, the training-mode disabled indicator 714 can be set to "false."

The selection circuit 606-2 of the mode-register read circuit 604 selects 710 if the configuration indicator 608 represents the configuration 306-1 and the training-mode disabled indicator 714 is "true." Alternatively, the selection circuit 606-2 selects 712 if the configuration indicator 608 represents the configuration 306-2 and the training-mode disabled indicator 714 is "true." In this manner, the mode-register read circuit 604 can pass the appropriate configuration-dependent operand 504 that represents the data reference voltage 708 based on the determined configuration 306 of the die 118.

Example Methods

Figure 9:
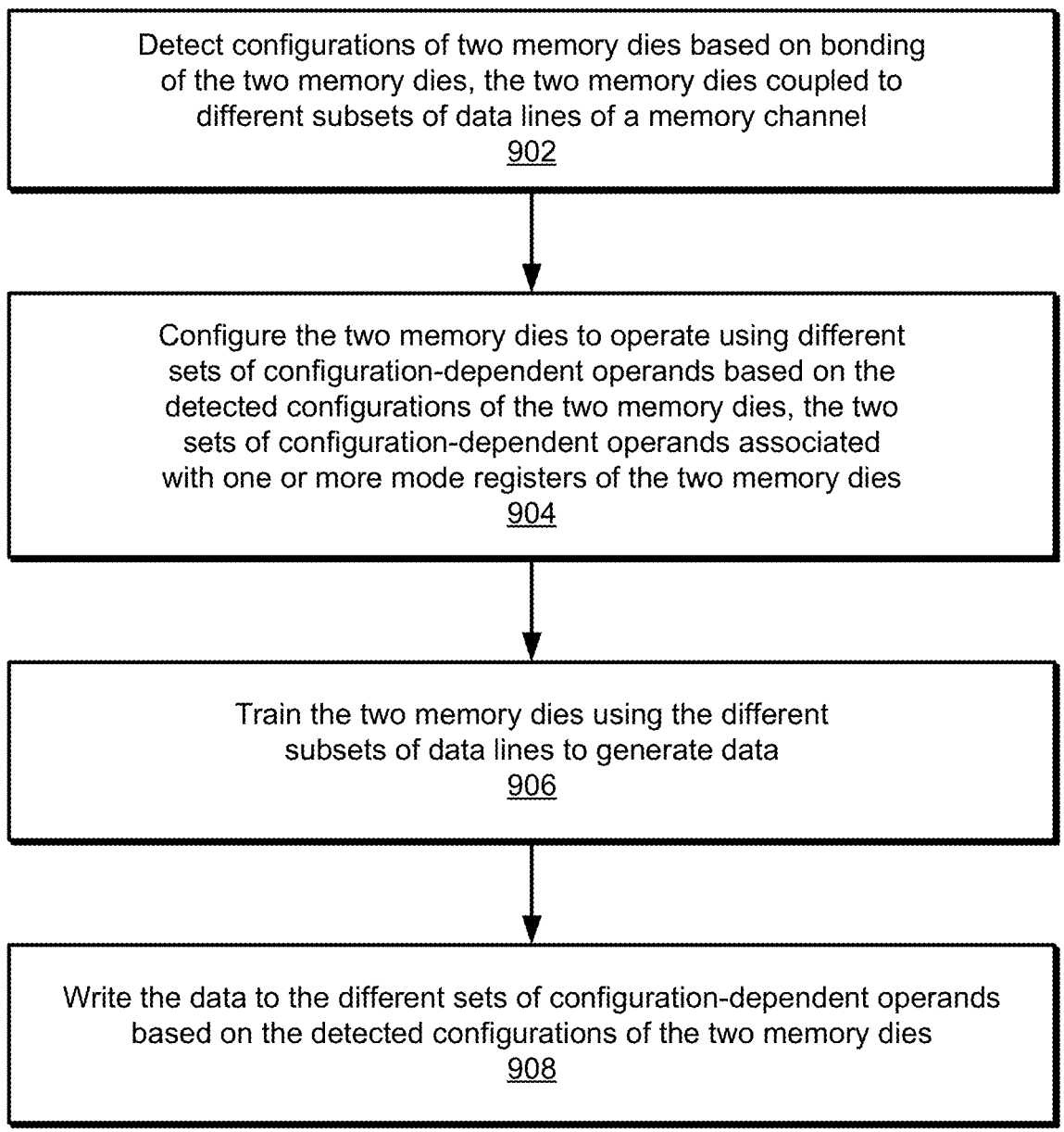
FIG. 9 illustrates another example method for performing aspects of adaptive selection of a configuration-dependent operand.

This section describes example methods 800 and 900 with reference to FIGS. 8 and 9 for implementing operations in accordance with various aspects of adaptive selection. These descriptions may also refer to components, entities, and other aspects depicted in FIGS. 1 to 7, to which reference is made only by way of example.

FIG. 8 illustrates an example method 800 for adaptive selection of a configuration-dependent operand. In aspects, operations of the method 800 are implemented by or with the memory die 118 as described with reference to FIGS. 1 to 7.

At block 802, a configuration of a memory die that is coupled to a subset of data lines of a memory channel is determined. For example, the memory die 118 uses the configuration-detection circuit 122 to determine the configuration 306. The configuration 306 represents a byte position or assignment of the die 118. In some implementations, the configuration 306 can be associated with a first byte configuration 308-1 (e.g., a lower byte configuration) or a second byte configuration 308-2 (e.g., an upper byte configuration). The configuration-detection circuit 122 can generate a configuration indicator 608 that indicates the configuration 306 of the memory die 118, as shown in FIG. 6. The memory die 118 is coupled to a subset of data lines 414 of a memory channel 412, as shown in FIG. 4.

At block 804, the memory die is configured to operate using a first set of operands or a second set of operands based on the determined configuration of the memory die. The first and second set of operands are associated with one or more mode registers. For example, the memory die 118 is configured to operate using the first set of operands 504-1 or the second set of operands 504-2 based on its configuration 306, as described with respect to FIGS. 6 and 7. More specifically, the memory die 118 can read from or write to the configuration-dependent operands 504 that correspond with its configuration 306. The first and second set of operands 504-1 and 504-2 are associated with one or more mode registers 120, as described with respect to FIG. 5.

With adaptive selection, a memory device 108 with dies 118 having a first byte width (e.g., 1 byte) can be transparent to a memory channel 412 having a second byte width that is larger than the first byte width (e.g., two bytes). For example, two 8-bit dies enabled with aspects of adaptive selection may be coupled to a 16-bit memory channel and each automatically detect its byte position (e.g., upper byte or lower byte). Based on the detected byte position or byte indicator, the 8-bit dies may be configured for use through respective mode registers (an upper mode register or a lower mode register) that correspond to the byte position or assignment of the die.

FIG. 9 illustrates another example method 900 for adaptive selection of a configuration-dependent operand. In aspects, operations of the method 900 are implemented by or with a memory device 108 including memory dies 118-1 and 118-2, as described with reference to FIGS. 1 to 7.

At block 902, configurations of two memory dies are detected based on bonding of the two memory dies. The memory dies are coupled to different subsets of data lines of a memory channel. For example, the two memory dies 118-1 and 118-2 determine their configurations 306 based on the bonding of the two memory dies 118-1 and 118-2. In other implementations, the two memory dies 118-1 and 118-2 can determine their configurations 306 using other techniques besides bonding. The memory die 118-1 can have the first configuration 306-1 and the memory die 118-2 can have the second configuration 306-2. The memory dies 118-1 and 118-2 are coupled to different subsets of data lines 414 of the memory channel 412, as shown in FIG. 4.

At block 904, the two memory dies are configured to operate using different sets of configuration-dependent operands based on the detected configurations of the two memory dies. The two sets of configuration-dependent operands are associated with one or more mode registers of the two memory dies. For example, the memory dies 118-1 and 118-2 configure themselves to operate using different sets of configuration-dependent operands 506-1 and 506-2 based on the detected configurations 306-1 and 306-2.

At block 906, the two memory dies are trained using the different subsets of data lines to generate data. For example, the memory dies 118-1 and 118-2 participate in a training procedure with the physical interface 404 of the memory controller 114 using the different subsets of data lines 414-1 and 414-2. The training logic 408 generates data, which represents the results of the training procedure.

At block 908, the data is written to the different sets of configuration-dependent operands based on the detected configurations of the two memory dies. For example, the memory dies 118-1 and 118-2 write the data to the different sets of configuration-dependent operands 506-1 and 506-2 based on the detected configurations 306-1 and 306-2. With adaptive selection, configuration-dependent operands 504 of the dies 118-1 and 118-2 can be correctly programmed with the training results based on the configurations 306-1 and 306-2.

For the figures described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses or components shown in FIGS. 1 to 8, the components of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

In the following, various examples for implementing aspect of adaptive selection of a configuration-dependent operand are described:

Example 1: An apparatus comprising:
a memory die comprising:
one or more mode registers comprising a first set of operands associated with a first configuration and a second set of operands associated with a second configuration, the memory die configured to:
be coupled to a subset of data lines of a memory channel;
determine a configuration of the memory die, the configuration associated with the subset of data lines to which the memory die is coupled; and
configure the memory die to operate using the first set of operands or the second set of operands based on the determined configuration of the memory die.

Example 2: The apparatus of example 1 or any other example, wherein the memory die is configured to selectively:

read or write to the first set of operands of the one or more mode registers based on the determined configuration representing the first configuration; or read or write to the second set of operands of the one or more mode registers based on the determined configuration representing the second configuration.

Example 3: The apparatus of example 1 or any other example, wherein the memory die is configured to:

receive data from a memory controller via the subset of data lines, the data comprising a result of a training procedure; and selectively:

write the data to the first set of operands of the one or more mode registers based on the determined configuration representing the first configuration; or write the data to the second set of operands of the one or more mode registers based on the determined configuration representing the second configuration.

Example 4: The apparatus of example 1 or any other example, wherein:

the memory die comprises a first memory die; and the apparatus further comprises a second memory die comprising:

one or more other mode registers comprising the first set of operands associated with the first configuration and the second set of operands associated with the second configuration, the second memory die is configured to:

be coupled to another subset of data lines of the memory channel;

determine a configuration of the second memory die, the configuration associated with the other subset of data lines to which the memory die is coupled; and configure the second memory die to operate using the first set of operands or the second set of operands based on the determined configuration of the second memory die.

Example 5: The apparatus of example 4 or any other example, wherein:

the configuration of the first memory die comprises the first configuration; and the configuration of the second memory die comprises the second configuration.

Example 6: The apparatus of example 4 or any other example, wherein:

the subset of data lines of the memory channel is associated with lower byte; and the other subset of data lines of the memory channel is associated with an upper byte.

Example 7: The apparatus of example 4 or any other example, wherein:

the memory channel has a first byte width; and the first memory die and the second memory die have a second byte width that is less than the first byte width.

Example 8: The apparatus of example 4 or any other example, further comprising:

a memory device configured to be coupled to the memory channel via the subset of data lines and the other subset of data lines, wherein:

the memory device comprises the first memory die and the second memory die.

Example 9: The apparatus of example 8 or any other example, wherein:

the memory channel comprises a 16-bit memory channel; the first memory die and the second memory die comprise two 8-bit dies; and the memory device is configured to operate in accordance with a two-byte mode and support an LPDDR5 protocol.

Example 10: The apparatus of example 1 or any other example, wherein the memory die is configured to determine the configuration of the memory die based on bonding of the memory die.

Example 11: The apparatus of example 1 or any other example, wherein the first set of operands and the second set of operands are associated with at least one of the following:

a data reference voltage;

on-die termination;

decision feedback equalization quality;

a duty cycle monitor;

a duty cycle adjustor; or data calibration.

Example 12: The apparatus of example 1 or any other example, wherein the apparatus comprises a Compute Express Link® (CXL®) device.

Example 13: An apparatus comprising:

a memory device comprising:

two memory dies configured to:

be coupled to different subsets of data lines of a memory channel;

have different configurations associated with the different subsets of data lines; and read or write to different sets of configuration-dependent operands associated with one or more mode registers based on the different configurations.

Example 14: The apparatus of example 13 or any other example, wherein the different subsets of data lines comprise:

a first subset of data lines associated with a first byte of the memory channel; and a second subset of data lines associated with a second byte of the memory channel.

Example 15: The apparatus of example 13 or any other example, wherein:

the memory channel has a first byte width; and the two memory dies each have a second byte width that is less than the first byte width.

Example 16: The apparatus of example 13 or any other example, wherein the two memory dies are configured to detect the different configurations based on bonding of the two memory dies.

Example 17: The apparatus of example 13 or any other example, wherein the two memory dies are each configured to:

receive data from a memory controller via one of the different subsets of data lines, the data comprising a result of a training procedure; and write the data to one of the different sets of configuration-dependent operands based on its configuration.

Example 18: A method comprising:

detecting configurations of two memory dies based on bonding of the two memory dies, the two memory dies coupled to different subsets of data lines of a memory channel;

configuring the two memory dies to operate using different sets of configuration-dependent operands based on the detected configurations of the two memory dies, the different sets of configuration-dependent operands associated with one or more mode registers of the two memory dies;

training the two memory dies using the different subsets of data lines to generate training data; and writing the data to the different sets of configuration-dependent operands based on the detected configurations of the two memory dies.

Example 19: The method of example 18 or any other example, wherein the configuring of the two memory dies comprises enabling the two memory dies to read from or write to the different sets of configuration-dependent operands based on the detected configurations of the two memory dies.

Example 20: The method of example 18 or any other example, wherein the detecting the configurations of the two memory dies comprises:
- determining that a configuration of a first die of the two memory dies is associated with a first byte configuration; and
- determining that a configuration of a second die of the two memory dies is associated with a second byte configuration that is different than the first byte configuration.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although implementations for adaptive selection of a configuration-dependent operand have been described in language specific to certain features and/or methods, the subject of the appended claims is not limited to the specific features or methods described. Rather, the specific features and methods are disclosed as example implementations for adaptive selection of a configuration-dependent operand.

What is claimed is:

1. An apparatus comprising:
a memory die comprising:
one or more mode registers comprising a first set of operands associated with a first configuration and a second set of operands associated with a second configuration, the memory die configured to:
be coupled to a subset of data lines of a memory channel;
determine a configuration of the memory die, the configuration associated with the subset of data lines to which the memory die is coupled; and
configure the memory die to operate using the first set of operands or the second set of operands based on the determined configuration of the memory die.

2. The apparatus of claim 1, wherein the memory die is configured to selectively:
read or write to the first set of operands of the one or more mode registers based on the determined configuration representing the first configuration; or
read or write to the second set of operands of the one or more mode registers based on the determined configuration representing the second configuration.

3. The apparatus of claim 1, wherein the memory die is configured to:
receive data from a memory controller via the subset of data lines, the data comprising a result of a training procedure; and
selectively:
write the data to the first set of operands of the one or more mode registers based on the determined configuration representing the first configuration; or
write the data to the second set of operands of the one or more mode registers based on the determined configuration representing the second configuration.

4. The apparatus of claim 1, wherein:
the memory die comprises a first memory die; and
the apparatus further comprises a second memory die comprising:
one or more other mode registers comprising the first set of operands associated with the first configuration and the second set of operands associated with the second configuration,
the second memory die is configured to:
be coupled to another subset of data lines of the memory channel;
determine a configuration of the second memory die, the configuration associated with the other subset of data lines to which the memory die is coupled; and
configure the second memory die to operate using the first set of operands or the second set of operands based on the determined configuration of the second memory die.

5. The apparatus of claim 4, wherein:
the configuration of the first memory die comprises the first configuration; and
the configuration of the second memory die comprises the second configuration.

6. The apparatus of claim 4, wherein:
the subset of data lines of the memory channel is associated with lower byte; and
the other subset of data lines of the memory channel is associated with an upper byte.

7. The apparatus of claim 4, wherein:
the memory channel has a first byte width; and
the first memory die and the second memory die have a second byte width that is less than the first byte width.

8. The apparatus of claim 4, further comprising:
a memory device configured to be coupled to the memory channel via the subset of data lines and the other subset of data lines, wherein:
the memory device comprises the first memory die and the second memory die.

9. The apparatus of claim 8, wherein:
the memory channel comprises a 16-bit memory channel;
the first memory die and the second memory die comprise two 8-bit dies; and
the memory device is configured to operate in accordance with a two-byte mode and support an LPDDR5 protocol.

10. The apparatus of claim 1, wherein the memory die is configured to determine the configuration of the memory die based on bonding of the memory die.

11. The apparatus of claim 1, wherein the first set of operands and the second set of operands are associated with at least one of the following:
a data reference voltage;
on-die termination;
decision feedback equalization quality;
a duty cycle monitor;
a duty cycle adjustor; or
data calibration.

12. The apparatus of claim 1, wherein the apparatus comprises a Compute Express Link® (CXL®) device.

13. An apparatus comprising:
a memory device comprising:
two memory dies configured to:
be coupled to different subsets of data lines of a memory channel;
have different configurations associated with the different subsets of data lines; and
read or write to different sets of configuration-dependent operands associated with one or more mode registers based on the different configurations.

14. The apparatus of claim 13, wherein the different subsets of data lines comprise:
a first subset of data lines associated with a first byte of the memory channel; and
a second subset of data lines associated with a second byte of the memory channel.

15. The apparatus of claim 13, wherein:
the memory channel has a first byte width; and
the two memory dies each have a second byte width that is less than the first byte width.

16. The apparatus of claim 13, wherein the two memory dies are configured to detect the different configurations based on bonding of the two memory dies.

17. The apparatus of claim 13, wherein the two memory dies are each configured to:
receive data from a memory controller via one of the different subsets of data lines, the data comprising a result of a training procedure; and
write the data to one of the different sets of configuration-dependent operands based on its configuration.

18. A method comprising:
detecting configurations of two memory dies based on bonding of the two memory dies, the two memory dies coupled to different subsets of data lines of a memory channel;
configuring the two memory dies to operate using different sets of configuration-dependent operands based on the detected configurations of the two memory dies, the different sets of configuration-dependent operands associated with one or more mode registers of the two memory dies;
training the two memory dies using the different subsets of data lines to generate training data; and
writing the data to the different sets of configuration-dependent operands based on the detected configurations of the two memory dies.

19. The method of claim 18, wherein the configuring of the two memory dies comprises enabling the two memory dies to read from or write to the different sets of configuration-dependent operands based on the detected configurations of the two memory dies.

20. The method of claim 18, wherein the detecting the configurations of the two memory dies comprises:
determining that a configuration of a first die of the two memory dies is associated with a first byte configuration; and
determining that a configuration of a second die of the two memory dies is associated with a second byte configuration that is different than the first byte configuration.

* * * * *